US012798372B2

(12) United States Patent
Park et al.

(10) Patent No.: US 12,798,372 B2
(45) Date of Patent: Nov. 17, 2026

(54) APPARATUS AND METHOD FOR CONTROLLING A VEHICLE

(71) Applicants: HYUNDAI MOTOR COMPANY, Seoul (KR); KIA CORPORATION, Seoul (KR)

(72) Inventors: Jae Il Park, Hwaseong-si (KR); Sheen Gil Kang, Hwaseong-si (KR); Jang Hun Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 49 days.

(21) Appl. No.: 18/899,643

(22) Filed: Sep. 27, 2024

(65) Prior Publication Data

US 2025/0326295 A1 Oct. 23, 2025

(30) Foreign Application Priority Data

Apr. 19, 2024 (KR) ........................ 10-2024-0052916

(51) Int. Cl.
*B60K 35/10* (2024.01)
*B60W 60/00* (2020.01)

(52) U.S. Cl.
CPC ........... *B60K 35/10* (2024.01); *B60W 60/001* (2020.02)

(58) Field of Classification Search
CPC ..... B60K 35/10; B60W 60/001; B60W 30/00; B60W 10/08; B60W 10/22; B60W 2720/16; B60W 2720/18
See application file for complete search history.

(56) References Cited

U.S. PATENT DOCUMENTS

| | | | | |
|---|---|---|---|---|
| 10,940,872 | B2 | 3/2021 | Alexiou | |
| 11,247,596 | B1 | 2/2022 | Chang | |
| 2005/0027402 | A1 * | 2/2005 | Koibuchi | B60W 30/1819 701/1 |
| 2022/0072986 | A1 | 3/2022 | Chang | |
| 2022/0126640 | A1 * | 4/2022 | Anderson | A61B 5/4023 |

FOREIGN PATENT DOCUMENTS

| | | | |
|---|---|---|---|
| JP | 2005198207 | A | 7/2005 |
| KR | 20120110594 | A | 10/2012 |
| KR | 20190105207 | A | 9/2019 |
| KR | 20220033819 | A | 3/2022 |

* cited by examiner

*Primary Examiner* — Russell Frejd
*Assistant Examiner* — Ana D Thomas
(74) *Attorney, Agent, or Firm* — Lempia Summerfield Katz LLC

(57) ABSTRACT

A vehicle control apparatus includes an input device that receives an input of a user. The vehicle control apparatus also includes a processor that generates a target motion based on content running in the vehicle or the input of the user. The processor further generates a target motion value corresponding to the target motion. The processor additionally distributes control to one or more driving actuators to execute the target motion.

20 Claims, 14 Drawing Sheets

APPARATUS AND METHOD FOR CONTROLLING A VEHICLE

CROSS-REFERENCE TO RELATED APPLICATION

This application claims the benefit of and priority to Korean Patent Application No. 10-2024-0052916, filed on Apr. 19, 2024, the entire contents of which are hereby incorporated herein by reference.

TECHNICAL FIELD

The present disclosure relates to an apparatus and a method for controlling a vehicle.

BACKGROUND

As technology development of an autonomous vehicle expands, infotainment services or in-car entertainment services are provided to vehicles to improve convenience of passengers of the vehicles.

In-car entertainment may include content that the passenger may experience while traveling in the vehicle. For example, in-car entertainment allows the passenger to watch a movie, to play a game, and to listen to music while traveling in the vehicle.

SUMMARY

Aspects of the present disclosure provide an apparatus and a method for controlling a vehicle, that provide a new user experience (UX) by controlling a motion of the vehicle together with content (e.g., in-car entertainment) running in the vehicle.

Aspects of the present disclosure provide an apparatus and a method for controlling a vehicle, that control a motion of the vehicle by recognizing content running in the vehicle, generating a target motion for the content, distributing control to one or more actuators based on the target motion, and driving the one or more actuators based on the content.

Aspects of the present disclosure provide an apparatus and a method for controlling a vehicle, that allow a motion of the vehicle to be defined for each hardware of the vehicle by identifying an executable motion based on the hardware of the vehicle and distributing control to one or more actuators to execute the executable motion.

Aspects of the present disclosure provide an apparatus and a method for controlling a vehicle, that control a motion of a vehicle based on the motion customized to a user by generating a target motion with a control value set by the user as well as content running in the vehicle.

The technical problems to be solved by the present disclosure are not limited to the aforementioned problems. Other technical problems not mentioned herein should be more clearly understood from the following description by those having ordinary skill in the art to which the present disclosure pertains.

According to embodiments of the present disclosure, a vehicle control apparatus is provided. The vehicle control apparatus includes an input device configured to receive an input of a user. The control apparatus also includes a processor configured to generate a target motion based on content running in the vehicle or the input of the user. The processor is also configured to generate a target motion value corresponding to the target motion. The processor is additionally configured to distribute control to one or more driving actuators to execute the target motion.

In an embodiment, the processor may be configured to generate the target motion including at least one of a movement of the vehicle in a forward direction and a backward direction, a movement of the vehicle in an upward direction and a downward direction, a movement of the vehicle in a pitch direction, a movement of the vehicle in a roll direction, or any combination thereof.

In an embodiment, the processor may be configured to determine an executable motion as an execution motion based on hardware information of the vehicle.

In an embodiment, the processor may be configured to generate an execution motion value corresponding to the execution motion based on the hardware information of the vehicle.

In an embodiment, the processor may be configured to determine whether the target motion value is equal to or less than the execution motion value.

In an embodiment, the processor may be configured to correct the target motion value so that the target motion value is equal to or less than the execution motion value when the target motion value is not equal to or less than the execution motion value.

In an embodiment, the processor may be configured to determine that the target motion is executable when the target motion value or the corrected target motion value is equal to or less than the execution motion value.

In an embodiment, the processor may be configured to select, as the one or more driving actuators, one or more actuators capable of executing the target motion.

In an embodiment, the processor may be configured to select, as the one or more driving actuators, the one or more actuators capable of executing the execution motion when the processor is capable of executing the target motion using the one or more actuators.

In an embodiment, the processor may be configured to control driving of the one or more driving actuators based on the target motion value or the corrected target motion value.

In another embodiment, a method for controlling a vehicle is provided. The method includes generating a target motion based on content running in the vehicle or an input of a user. The method also includes generating a target motion value corresponding to the target motion. The method additionally includes distributing control to one or more driving actuators to execute the target motion.

In an embodiment, the target motion may include at least one of a movement of the vehicle in a forward direction and a backward direction, a movement of the vehicle in an upward direction and a downward direction, a movement of the vehicle in a pitch direction, a movement of the vehicle in a roll direction, or any combination thereof.

In an embodiment, the method may further include determining an executable motion as an execution motion based on hardware information of the vehicle.

In an embodiment, the method may further include generating an execution motion value corresponding to the execution motion based on the hardware information of the vehicle.

In an embodiment, the method may further include determining whether the target motion value is equal to or less than the execution motion value.

In an embodiment, the method may further include correcting the target motion value so that the target motion value is equal to or less than the execution motion value when the target motion value is not equal to or less than the execution motion value.

In an embodiment, the method may further include determining that the target motion is executable when the target motion value or the corrected target motion value is equal to or less than the execution motion value.

In an embodiment, the method may further include selecting, as the one or more driving actuators, one or more actuators capable of executing the target motion.

In an embodiment, the method may further include selecting, as the one or more driving actuators, the one or more actuators capable of executing the execution motion when the target motion can be executed using the one or more actuators.

In an embodiment, the method may further include controlling driving of the one or more driving actuators based on the target motion value or the corrected target motion value.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Figure 1:
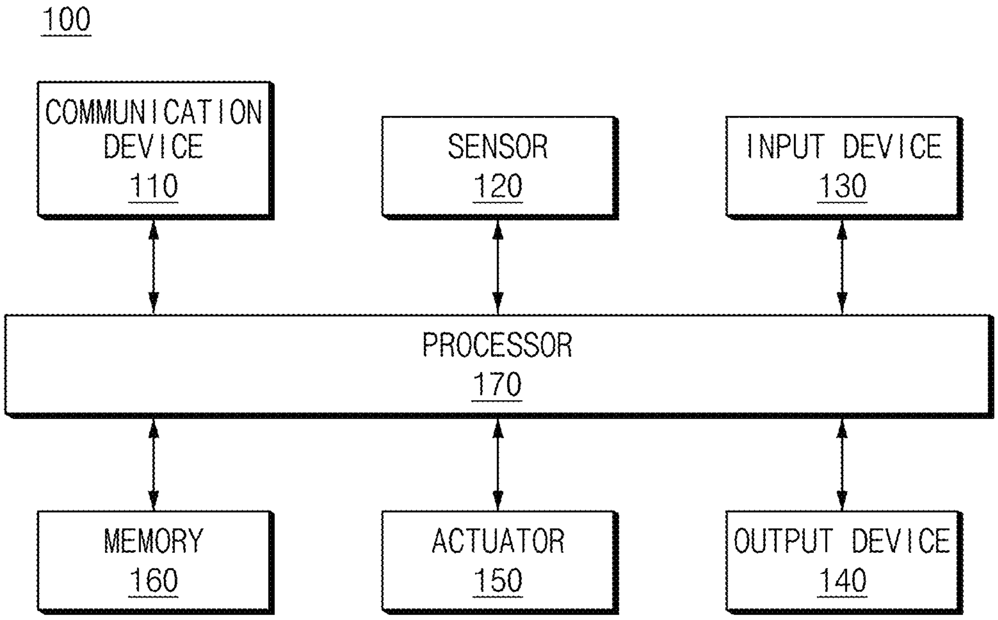
FIG. 1 is a diagram illustrating a configuration of a vehicle control apparatus according to an embodiment of the present disclosure.

Hereinafter, embodiments of the present disclosure are described in detail with reference to the accompanying drawings. In adding the reference numerals to the components of each drawing, it should be noted that the identical or equivalent components are designated by the identical numerals even when the components are displayed on different drawings. Further, in describing embodiments of the present disclosure, a detailed description of the related known configuration or function has been omitted when it was determined that the detailed description interferes with the understanding of the gist of the present disclosure.

In the present disclosure, terms such as first, second, A, B, (a), (b), and the like may be used. These terms are merely intended to distinguish the components from other components. The terms do not limit the nature, order, or sequence of the components. Unless otherwise defined, all terms including technical and scientific terms used herein have the same meaning as commonly understood by one of ordinary skill in the art to which the present disclosure pertains. It should be further understood that terms such as those defined in commonly used dictionaries should be interpreted as having a meaning that is consistent with their meaning in the context of the relevant art and should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or perform that operation or function.

FIG. 1 is a diagram illustrating a configuration of a vehicle control apparatus according to an embodiment of the present disclosure.

As illustrated in FIG. 1, a vehicle control apparatus 100 may include a communication device 110, a sensor 120, an input device 130, an output device 140, an actuator 150, a memory 160, and a processor 170. According to an embodiment, the vehicle control apparatus 100 may be provided in an autonomous vehicle.

The communication device 110 may include a transceiver, a communication circuit, a communication processor, and/or the like, that transmits and receives information by using an antenna. The communication device 110 may communicate with a server (not illustrated) that provides via content various wireless communication methods such as Wi-Fi, Wi-Bro, global system for mobile communication (GSM), code division multiple access (CDMA), wideband code division multiple access (WCDMA), universal mobile telecommunication system (UMTS), time division multiple access (TDMA), and/or long term evolution (LTE).

The sensor 120 may obtain state information of the vehicle. For example, the sensor 120 may include an image sensor, a speed sensor, an acceleration sensor, an accelerator pedal sensor, an inclination sensor, a tire sensor, an illuminance sensor, and/or the like.

The input device 130 may receive an input corresponding to a touch, an operation, or a voice, and may transmit the input to the processor 170. According to an embodiment, the input device 130 may include a touch type input means or a mechanical input means. For example, the input device 130 may be executed with at least one of a motion recognition sensor for detecting a motion of a user, a voice recognition sensor for detecting a voice of the user, or a combination thereof.

The output device 140 may output the content selected by the user under control of the processor 170. The output device 140 may output an image or a sound included in the content. According to an embodiment, the output device 140 may be executed as a display device, a sound output device, and/or the like. The display device may include a head-up display (HUD), a cluster, and/or the like. According to an embodiment, the display device may be executed as a display device employing a liquid crystal display (LCD) panel, a light emitting diode (LED) panel, or an organic light emitting diode (OLED) panel. The display device may be executed as a touch screen panel (TSP).

The actuator 150 may include a device for controlling a vehicle. According to an embodiment, the actuator 150 may include a driving motor provided on front and rear wheels, an in-wheel motor, an active suspension, and/or the like.

The memory 160 may store at least one algorithm for calculating or executing various commands for the operation of the vehicle control apparatus according to an embodiment of the present disclosure. According to an embodiment, the memory 160 may store at least one command or instruction executable by the processor 170. The at last one command or instruction may cause the vehicle control apparatus of the present disclosure to operate. The memory 160 may include at least one storage medium among a flash memory, a hard disk, a memory card, a read-only memory (ROM), a random-access memory (RAM), an electrically erasable programmable read-only memory (EEPROM), a programmable read-only memory (PROM), a magnetic memory, a magnetic disk, and an optical disk.

The processor 170 may be implemented by various processing devices including a semiconductor chip capable of performing calculation or execution of various commands. The processor 170 may control the operation of the vehicle control apparatus according to an embodiment of the present disclosure. The processor 170 may be electrically connected to the communication device 110, the sensor 120, the input device 130, the output device 140, the actuator 150, the memory 160, via a wired cable or various circuits to transmit electrical signals including control commands. The processor 170 may perform calculations and/or data processing related to control and/or communication. The processor 170 may include at least one of a central processing unit (CPU), an application processor, a communication processor (CP), or any combination thereof.

The processor 170 may generate a target motion based on a content running in the vehicle or a control value input by the user. The processor 170 may further generate a target motion value corresponding to the target motion. The processor may additionally distribute control to one or more driving actuators to execute the target motion. A more detailed description of operations that may be performed by the processor 170 to generate a target motion, according to embodiments, is provided below with reference to FIG. 2.

Figure 2:
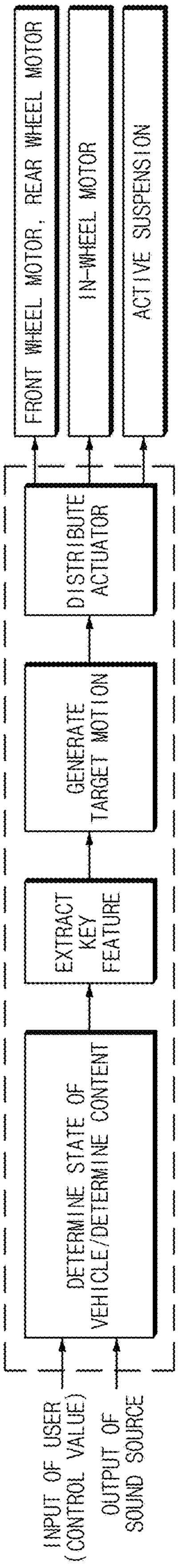
FIG. 2 is a diagram illustrating an operation of a vehicle control apparatus to an embodiment of the present disclosure.

FIG. 2 is a diagram illustrating an operation of a vehicle control apparatus according to an embodiment of the present disclosure.

As illustrated in FIG. 2, the processor 170 may determine a state of the vehicle based on state information of the vehicle detected by the sensor 120. According to an embodiment, the processor 170 may determine whether the vehicle is in a state capable of performing motion control. As an example, the processor 170 may determine whether the vehicle is in a state capable of performing a motion control based on a speed of the vehicle, whether a risk such as a risk of collision exists around the vehicle when an actuator is operated, an inclination of a road on which the vehicle is located, and/or the like.

In addition, the processor 170 may determine whether there is a running content in the vehicle based on a sound source output through the output device 140. When the processor 170 determines that running content exists in the vehicle, the processor 170 may determine whether the running content is music content, movie content, sleep content, or game content.

When the processor 170 determines that running content does not exist in the vehicle, the processor 170 may determine whether there is a control value input to execute a motion requested by the user.

The processor 170 may extract a key feature by processing a signal based on the running content or an input of the user (the control value).

The processor 170 may generate the target motion based on the extracted key feature. The target motion, according to embodiments, is described in more detail below with reference to FIG. 3.

The processor 170 may distribute control to one or more driving actuators to execute the target motion.

Figure 3:
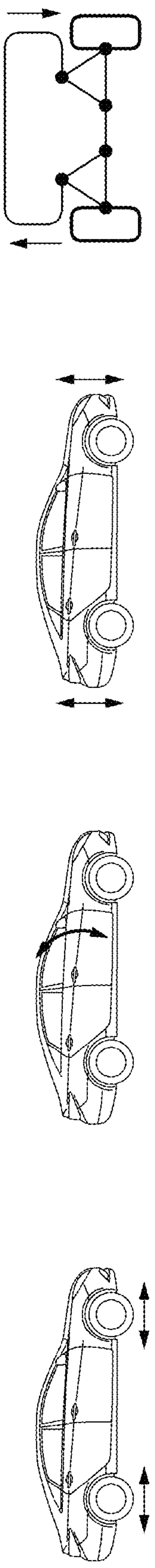
FIG. 3 is a diagram illustrating a target motion according to an embodiment of the present disclosure.

FIG. 3 is a diagram illustrating a target motion according to an embodiment of the present disclosure.

In an embodiment, the processor 170 according to an embodiment of the present disclosure may generate the target motion including at least one of a surge 331 movement of the vehicle in a forward direction and a backward direction, a pitch 332 movement of the vehicle in a pitch direction (a direction rotating around an axle), a bounce 333 movement of the vehicle in an upward direction and a downward direction, a roll 334 movement of the vehicle in a roll direction (a direction rotating around a direction perpendicular to the axle), or any combination thereof.

The processor 170 may distribute control to one or more driving actuators to execute the target motion. According to an embodiment, the one or more driving actuators may include a front wheel motor, a rear wheel motor, an in-wheel motor, and/or an active suspension.

According to an embodiment, when the target motion is generated, the processor 170 may generate a target motion value for executing the target motion, and may determine an executable execution motion based on hardware information of the vehicle to determine whether the vehicle is capable of executing the target motion. A more detailed description of operations that may be performed by the processor 170 to generate a target motion value, according to an embodiment, is provided below with reference to FIG. 4.

Figure 4:
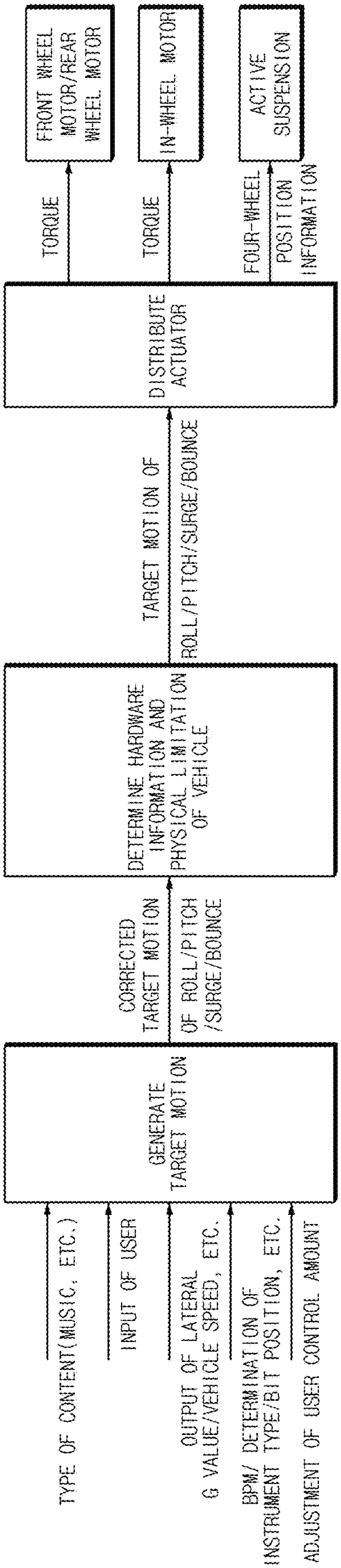
FIG. 4 is a diagram illustrating an operation of a vehicle control apparatus in detail according to an embodiment of the present disclosure.

FIG. 4 is a diagram illustrating an operation of a vehicle control apparatus in detail according to an embodiment of the present disclosure.

As illustrated in FIG. 4, according to an embodiment, the processor 170 may generate a target motion based on one or more of a type of content running in the vehicle, an input of the user, lateral acceleration information of the vehicle, a vehicle speed, BPM control of a sound source output through the output device 140, an instrument type, a bit position, and/or an adjustment of user control amount (e.g., the BPM control). The processor 170 may then generate a target motion value corresponding to the target motion. The target motion value may include a control value of an actuator for executing the target motion.

The processor 170 may determine hardware information of the vehicle and a physical limitation of the vehicle. The processor 170 may determine an execution motion executable by the vehicle (also sometimes referred to herein as "executable execution motion") based on the hardware information of the vehicle and the physical limitation of the vehicle. The execution motion executable by the vehicle may be a motion that the vehicle is capable of executing or performing.

According to an embodiment, the executable execution motion for each hardware may be stored in advance, and the processor 170 may determine the executable execution motion based on the hardware information of the vehicle by matching the hardware of the vehicle with previously stored information.

In addition, the processor 170 may generate an execution motion value corresponding to the execution motion executable for each hardware. The execution motion value may include a control value of the actuator executable based on the hardware information of the vehicle and the physical limitation of the vehicle. According to an embodiment, the execution motion executable for each hardware may be represented as illustrated in Table 1.

TABLE 1

| | Surge | Pitch | Roll | Bounce | Roll holding | Any motion holding |
|---|---|---|---|---|---|---|
| front and rear motors | ○ | ○ | | | | |
| in-wheel motor | ○ | ○ | ○ | | ○ | |
| active suspension | | ○ | ○ | ○ | | ○ |

The processor 170 may compare the target motion value with the execution motion value to determine whether the vehicle is capable of executing the target motion with the target motion value.

When the target motion value is equal to or less than the execution motion value, the processor 170 may determine that the target motion is executable.

On the other hand, when the target motion value is not equal to or less than the execution motion value (i.e., when the target motion value is greater than the execution motion value), the processor 170 may determine that the target motion cannot be executed with the target motion value in the vehicle. Accordingly, the processor 170 may correct the target motion value to be equal to or less than the execution motion value.

The processor 170 may determine whether the target motion can be executed by using the target motion value (or the corrected target motion value).

When the processor 170 determines that the target motion can be executed by using the target motion value (or the corrected target motion value), the processor 170 may select, as the one or more driving actuators, one or more actuators capable of executing the target motion. According to an embodiment, when the target motion can be executed by using an actuator capable of executing the execution motion, the processor 170 may select, as a driving actuator, the actuator capable of executing the execution motion.

When the driving actuator is selected, the processor 170 may operate each driving actuator based on the target motion value (or the corrected target motion value). According to an embodiment, the processor 170 may operate the driving actuator to execute the target motion with the target motion value (or the corrected target motion value) so that torque may be input to the front wheel motor, the rear wheel motor, and the in-wheel motor, and may allow four-wheel position information to be input to the active suspension.

According to an embodiment, when the processor 170 determines that the content running in the vehicle is music based on the sound source output from the output device 140, the processor 170 may separate the sound source for each frequency band, may determine the BPM, may separate the instrument from the sound source separated for each frequency band, or may extract a pattern. A more detailed description related to an operation of determining the BPM from the sound source, according to an embodiment, is provided below with reference to FIG. 5.

Figure 5:
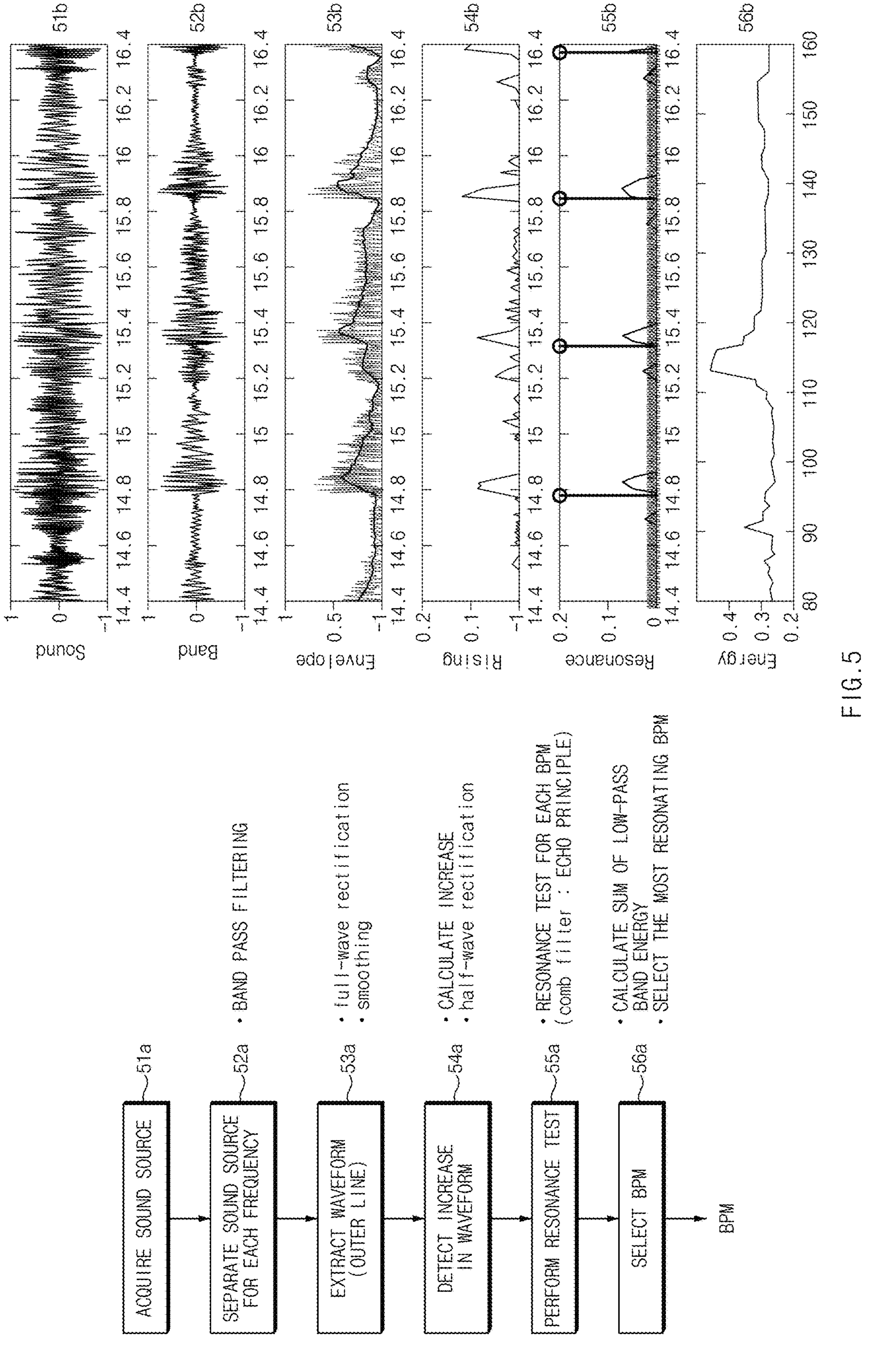
FIG. 5 is a diagram illustrating an operation for determining a bits per minute (BPM) based on a sound source, according to an embodiment of the present disclosure.

FIG. 5 is a diagram illustrating an operation for determining the BPM based on the sound source, according to an embodiment of the present disclosure.

As illustrated in FIG. 5, in an operation 51A, the processor 170 may acquire a sound source output, as shown in a plot 51B, through the output device 140.

In an operation 52A, the processor 170 may separate the sound source for each of multiple frequency bands, as shown in a plot 52B, by using a band pass filter.

In an operation 53A, when the sound source is separated for each of multiple frequency bands, the processor 170 may extract a waveform as shown in a plot 53B. According to an embodiment, the processor 170 may use full-wave rectification and a smoothing circuit.

In an operation 54A, when the waveform is extracted, the processor 170 may detect an increase in the waveform as shown in a plot 54B. According to an embodiment, the processor 170 may calculate the increment in the waveform increase by using half-wave rectification.

In an operation 55A, the processor 170 may perform a resonance test for each BPM as shown in a plot 55B.

In an operation 56A, the processor 170 may calculate sum of low-pass band energy, may select the BPM that resonates the most, and may determine this BPM as the BPM of the sound source as shown in a plot 56B.

The processor 170 may predict a position of a beat based on the determined BPM. The processor 170 may generate the target motion as the surge or the pitch based on the position of the beat, the separated musical instrument, and the extracted pattern. In addition, the processor 170 may generate a target surge value and a target pitch value as the target motion value based on the BPM, and may operate the driving actuator based on the target motion value. According to an embodiment, when the user selects a movie output, the processor 170 may stream and download movie from the server. The server may store the target motion and data for generating the target motion value based on time series data of each movie for each movie in advance, and the processor 170 may also receive the target motion and the target motion value while downloading the movie from the server. When the processor 170 determines that the content running in the vehicle is the movie based on the sound source output from the output device 140, the processor 170 may control the operation of the actuator based on the target motion and the target motion value received together at the time of downloading the movie.

According to an embodiment, when the processor 170 determines that the content running in the vehicle is the sleep based on the sound source output from the output device 140, the processor 170 may generate the target motion as the surge and may generate the target surge value as the target motion value. The processor 170 may operate the driving actuator based on the target motion value.

According to an embodiment, when the processor 170 determines that the content running in the vehicle is the game based on the sound source output from the output device 140, the processor 170 may generate the target motion as the roll, the pitch, and the bounce based on the vehicle speed, the degree of accelerator pedal pressure, and the lateral acceleration. The processor 170 may generate the target roll value, the target pitch value, and the target bounce value as the target motion value. The processor 170 may operate the driving actuator based on the target motion value.

Figure 6:
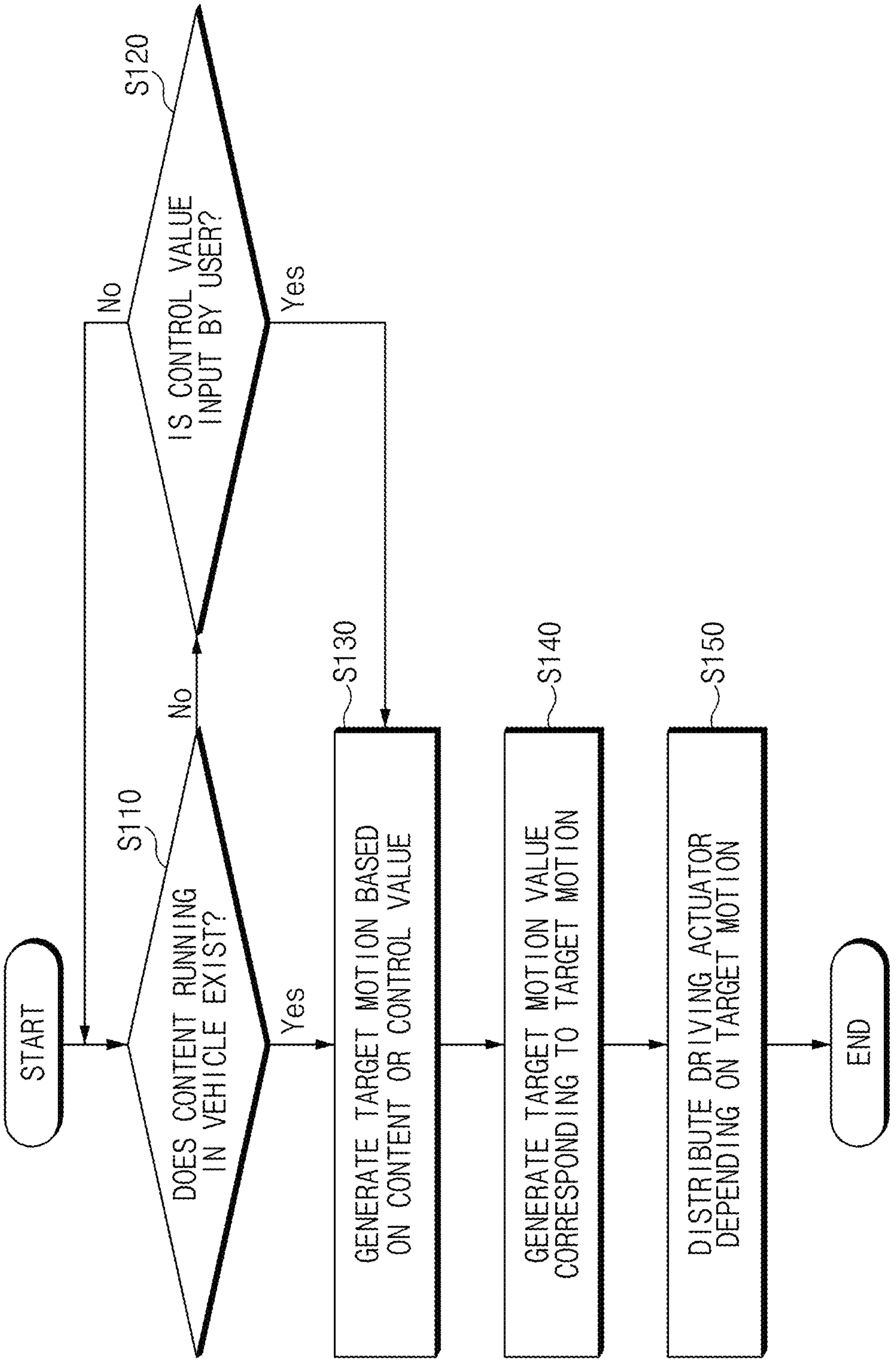
FIG. 6 is a flowchart illustrating a vehicle control method according to an embodiment of the present disclosure.

FIG. 6 is a flowchart illustrating a vehicle control method according to an embodiment of the present disclosure.

In an operation S110, the processor 170 may determine whether there is the content running in the vehicle.

In an operation S120, when there is no content running in the vehicle, the processor 170 may determine whether a control value is input by the user.

In an operation S130, the processor 170 may generate the target motion based on the content running in the vehicle or the control value input by the user.

In an operation S140, the processor 170 may generate the target motion value corresponding to the target motion.

In an operation S150, the processor 170 may distribute control to one or more driving actuators based on the target motion to execute the target motion. A more detailed description of the vehicle control method, according to an embodiment, is provided below with reference to FIG. 7.

Figure 7:
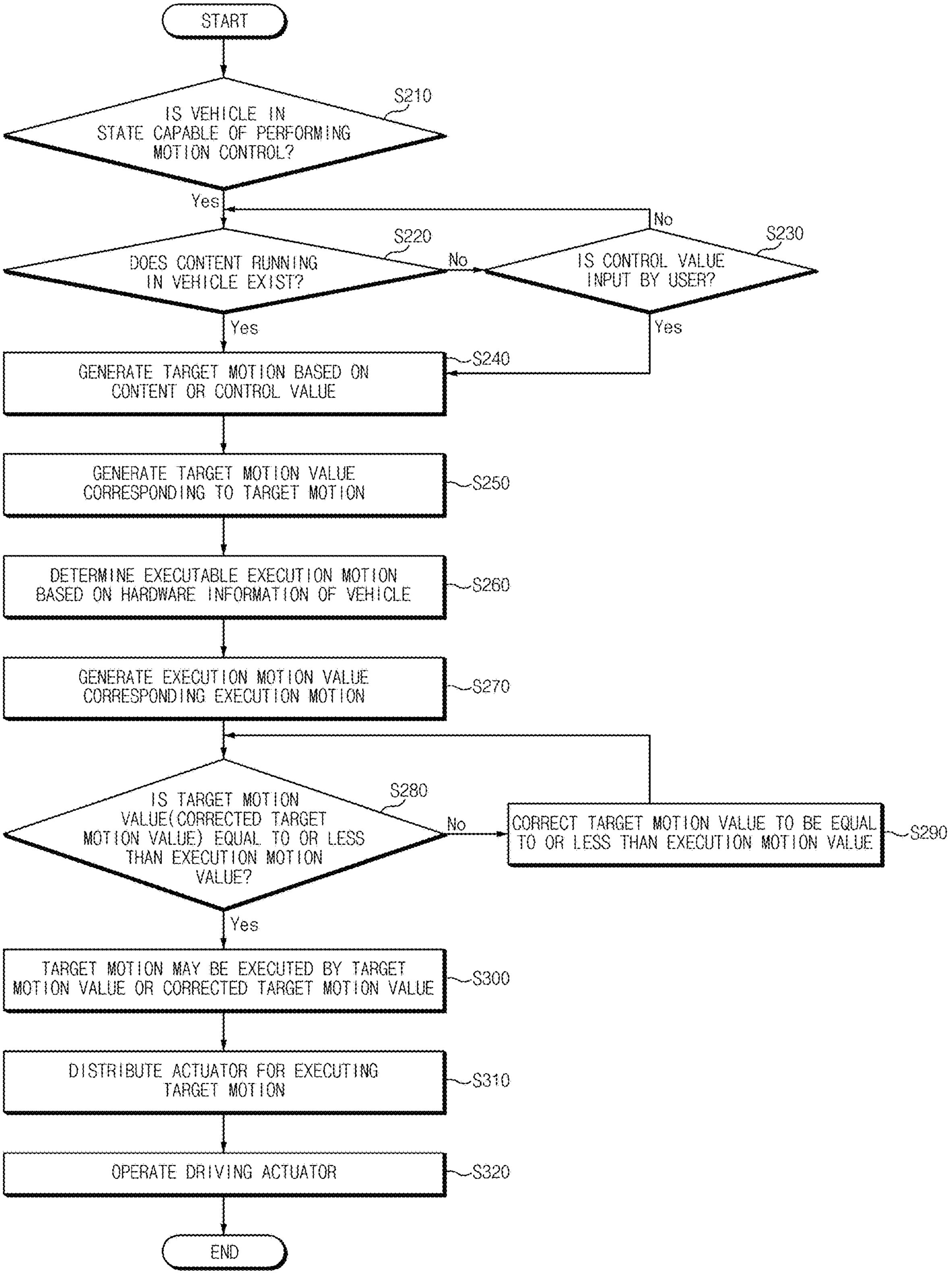
FIG. 7 is a flowchart illustrating a vehicle control method in detail according to an embodiment of the present disclosure.

FIG. 7 is a flowchart illustrating a vehicle control method in more detail according to an embodiment of the present disclosure.

As illustrated in FIG. 7, the processor 170 may determine the state of the vehicle based on the state information of the vehicle detected by the sensor 120. According to an embodiment, in an operation S210, the processor 170 may determine whether the vehicle is in the state capable of performing motion control.

As an example, in the operation S210, the processor 170 may determine whether the vehicle can perform the motion control based on the speed of the vehicle, whether risk such as collision exists around the vehicle when the actuator is operated, the inclination of the road on which the vehicle is located, and/or the like.

When the processor 170 determines that the vehicle is in the state capable of performing the motion control, in an operation S220, the processor 170 may determine whether there is running content in the vehicle based on sound source output through the output device 140.

When the processor 170 determines that running content exists in the vehicle, the processor 170 may determine whether the running content is music content, movie content, sleep content, or game content.

On the other hand, when the processor 170 determines that running content does not exist in the vehicle, in an operation S230, the processor 170 may determine whether the control value input to execute the motion requested by the user exists.

In an operation S240, the processor 170 may extract a key feature by processing the signal based on the running content or the input value of the user (the control value input by the user), and may generate the target motion based on the extracted key feature.

According to an embodiment, the processor 170 may generate the target motion including at least one of the movement of the vehicle in the forward direction and the backward direction (e.g., the surge 331 in FIG. 3), the movement of the vehicle in the pitch direction (e.g., the pitch 332 in FIG. 3), the movement of the vehicle in the upward direction and the downward direction (e.g., the bounce 333 in FIG. 3), the movement of the vehicle in the roll direction (e.g., the roll 334 in FIG. 3), or any combination thereof.

The processor 170 may distribute control to one or more driving actuators to execute the target motion. According to an embodiment, the one or more driving actuators may include the front wheel motor, the rear wheel motor, the in-wheel motor, and/or the active suspension.

According to an embodiment, when the target motion is generated, the processor 170 may generate a target motion value for executing the target motion in an operation S250. The target motion value may include the control value of the actuator for executing the target motion.

In an operation S260, the processor 170 may determine the hardware information of the vehicle and the physical limitation of the vehicle to determine whether the vehicle can execute the target motion. In an embodiment, the processor 170 may determine the executable execution motion based on the hardware information of the vehicle and the physical limitation of the vehicle.

According to an embodiment, the processor 170 may store the executable motion for each hardware in advance, and may determine the executable execution motion based on the hardware information of the vehicle by matching the hardware of the vehicle with the previously stored information.

In an operation S270, the processor 170 may generate the execution motion value corresponding to the execution motion executable for each hardware.

The processor 170 may compare the target motion value with the execution motion value to determine whether the vehicle may execute the target motion with the target motion value. According to an embodiment, in an operation S280, the processor 170 may determine whether the target motion value is equal to or less than the execution motion value.

When the target motion value is not equal to or less than the execution motion value (i.e., when the target motion value is greater than the execution motion value), the processor 170 may determine that the target motion cannot be executed with the target motion value in the vehicle. Accordingly, in an operation S290, the processor 170 may correct the target motion value to be equal to or less than the execution motion value.

In an operation S300, When the target motion value (or the corrected target motion value) is equal to or less than the execution motion value, the processor 170 may determine that the target motion may be executed.

In an operation S310, when the processor 170 determines that the target motion can be executed by using the target motion value (or the corrected target motion value), the processor 170 may distribute control to the one or more driving actuators capable of executing the target motion.

According to an embodiment, when the processor 170 can execute the target motion using one or more actuators capable of executing the execution motion, the processor 170 may select, as the one or more driving actuators, the one or more actuators capable of executing the execution motion.

In an operation S320, when the one or more actuators are selected as the one or more driving actuators, the processor 170 may operate each of the one or more driving actuator based on the target motion value (or the corrected target motion value).

According to an embodiment, the processor 170 may operate each driving actuator based on the target motion value (or the corrected target motion value). According to an embodiment, the processor 170 may input the torque to the front wheel motor, the rear wheel motor, and the in-wheel motor so that the target motion is executed with the target motion value (or the corrected target motion value), and may allow the four-wheel position information to be input to the active suspension.

Figure 8:
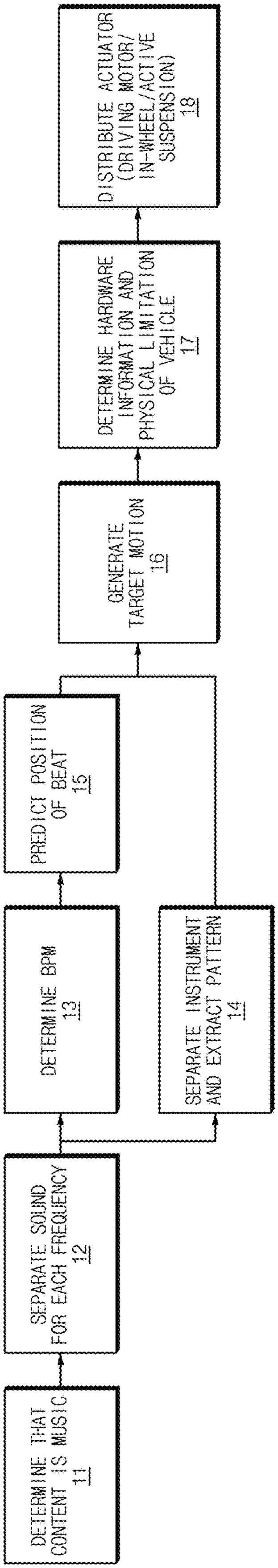
FIG. 8 is a diagram illustrating in detail an operation for controlling a target motion when content determined according to an embodiment of the present disclosure is music.

FIG. 8 is a diagram illustrating in detail an operation for controlling a target motion when the content determined according to an embodiment of the present disclosure is music content.

As illustrated in FIG. 8, when the processor 170 determines in an operation 11 that the content running in the vehicle is music based on the sound source output from the output device 140, the processor 170 may separate the sound source for each frequency band in an operation 12 and may determine the BPM in an operation 13. Alternatively, the processor 170 may separate the instrument from the sound source separated for each frequency band in an operation 14. The processor 170 may predict the position of the beat based on the determined BPM in an operation 15.

The processor 170 may generate the target motion based on the position of the beat, the separated musical instrument, and the extracted pattern in an operation 16. According to an embodiment, the processor 170 may generate the target motion as the surge or the pitch. In addition, the processor 170 may generate the target surge value and the target pitch value based on the BPM.

The processor 170 may determine the hardware information of the vehicle and the physical limitation of the vehicle in an operation 17. The processor 1 determine the executable execution motion based on the hardware information of the vehicle and the physical limitation of the vehicle, and may generate the execution motion value corresponding to the execution motion.

The processor 170 may compare the target motion value with the execution motion value, may determine that the target motion cannot be executed with the target motion value in the vehicle when the target motion value is not equal to or less than the execution motion value (i.e., when the target motion value is greater than the execution motion value), and may correct the target motion value to be equal to or less than the execution motion value.

When the processor 170 determines that the target motion may be executed by using the target motion value (or the corrected target motion value), the processor 170 may select, as the one or more driving actuators, the one or more actuators capable of executing the target motion in an operation 18. According to an embodiment, when the one or more actuators are selected as the one or more driving actuators, the processor 170 may operate each of the one or more driving actuators based on the target motion value (or the corrected target motion value). According to an embodiment, the processor 170 may operate the one or more driving actuators to execute the target motion with the target motion value (or the corrected target motion value) so that the torque may be input to the front wheel motor, the rear wheel motor, and the in-wheel motor, and may allow the four-wheel position information to be input to the active suspension.

Figure 9A:
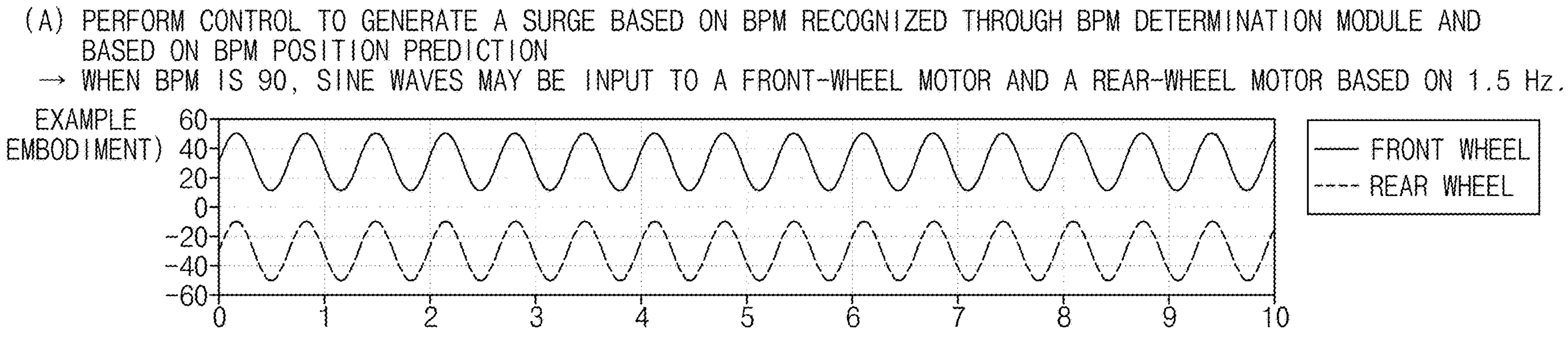
FIGS. 9A and 9B are diagrams illustrating an actuator operation according to a target motion generated according to an embodiment of the present disclosure.
Figure 9B:
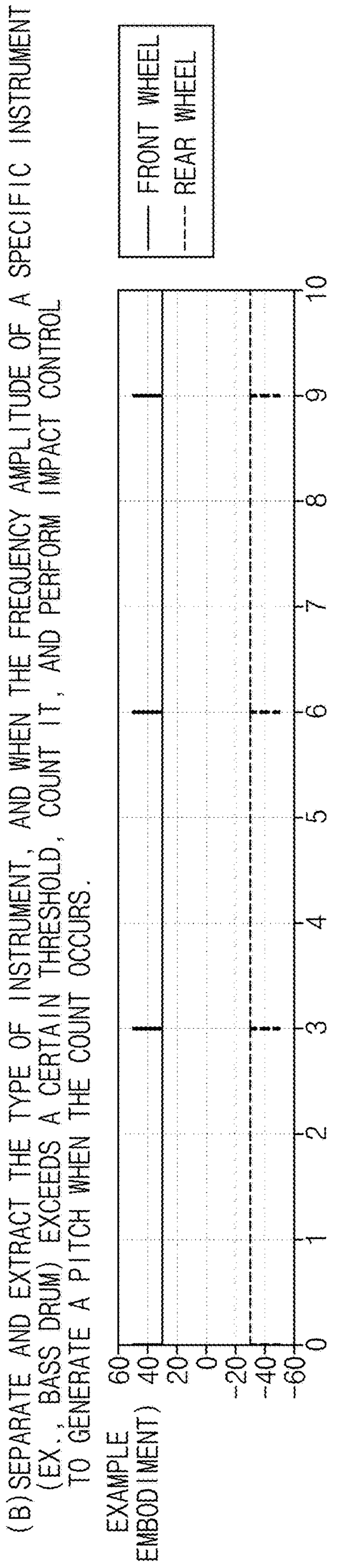

FIGS. 9A and 9B are diagrams illustrating an actuator operation according to a target motion generated according to an embodiment of the present disclosure.

As illustrated in FIG. 9A, the processor 170 may separate the sound source for each frequency band to determine the BPM, may predict the position of the beat based on the determined BPM, may distribute control to one or more driving actuators, and may operate the one or more driving actuators to input sine waves to the front wheel motor and the rear wheel motor to execute the surge. According to an embodiment, when the BPM is 90, the sine waves may be input to the front wheel motor and the rear wheel motor based on 1.5 Hz.

Figure 10:
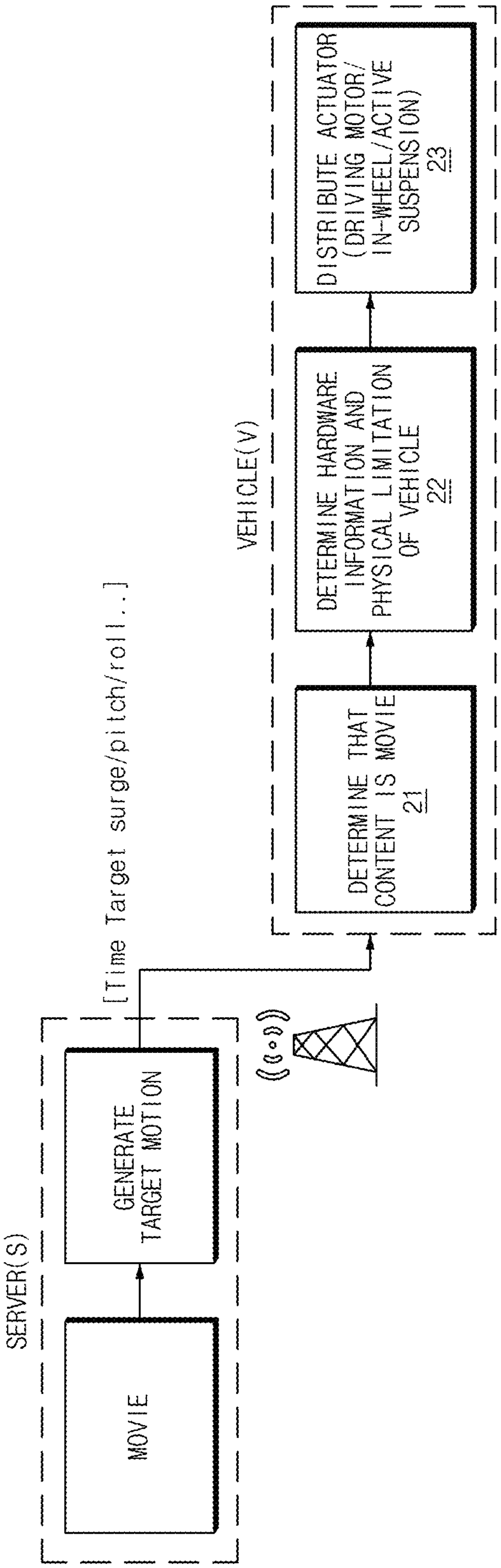
FIG. 10 is a diagram illustrating in detail an operation for controlling a target motion when content determined according to an embodiment of the present disclosure is a movie.

In addition, as illustrated in FIG. 9B, the processor 170 may separate and extract the instrument, may count when frequency amplitude of a specific instrument (e.g., a bass drum) exceeds a threshold, and may input the torque to the front wheel motor and the rear wheel motor to execute the pitch at each time it is counted. FIG. 10 is a diagram illustrating in detail an operation for controlling a target motion when content determined according to an embodiment of the present disclosure is a movie.

As illustrated in FIG. 10, when the user selects the movie output, the processor 170 may stream and download the movie from the server "S". The server "S" may store, in advance, data for generating the target motion and the target motion value based on the time series data of each movie for each movie. The processor 170 may also receive the target motion and the target motion value while downloading the movie from the server "S".

When the processor 170 determines that the content running in the vehicle "V" is the movie based on the sound source output from the output device 140 in an operation 21, the processor 170 may check the target motion and the target motion value together while downloading the movie.

The processor 170 may determine the hardware information of the vehicle and the physical limitation of the vehicle in an operation 22. The processor 170 may determine the executable execution motion based on the hardware information of the vehicle and the physical limitation of the vehicle, and may generate the execution motion value corresponding to the execution motion.

The processor 170 may compare the target motion value with the execution motion value, may determine that the target motion cannot be executed with the target motion value in the vehicle when the target motion value is not equal to or less than the execution motion value (i.e., when the target motion value is greater than the execution motion value), and may correct the target motion value to be equal to or less than the execution motion value.

When the processor 170 determines that the target motion may be executed by using the target motion value (or the corrected target motion value), the processor 170 may select, as one or more driving actuators, one or more actuators capable of executing the target motion in an operation 23. According to an embodiment, when the one or more actuators are selected as the one or more driving actuators, the processor 170 may operate each of the one or more driving actuators based on the target motion value (or the corrected target motion value). According to an embodiment, the processor 170 may operate the one or more driving actuators to execute the target motion with the target motion value (or the corrected target motion value), so that the torque may be input to the front wheel motor, the rear wheel motor, and the in-wheel motor, and may allow the four-wheel position information to be input to the active suspension.

Figure 11:
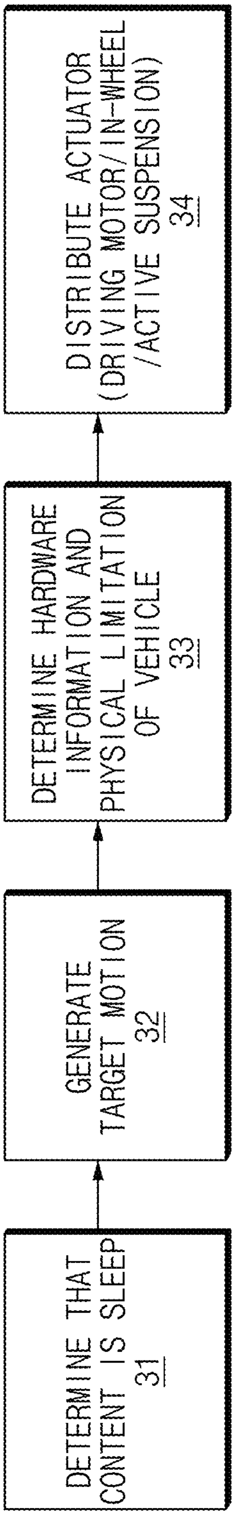
FIG. 11 is a diagram illustrating in detail an operation for controlling a target motion when content determined according to an embodiment of the present disclosure is sleep.

FIG. 11 is a diagram illustrating in detail an operation for controlling a target motion when the content determined according to an embodiment of the present disclosure is sleep.

As illustrated in FIG. 11, when the processor 170 determines that the content running in the vehicle is sleep based on the sound source output from the output device 140 in an operation 31, the processor 170 may generate the target motion as the surge in an operation 32. In addition, the processor 170 may generate the target surge value corresponding to the target motion.

The processor 170 may determine the hardware information of the vehicle and the physical limitation of the vehicle in an operation 33. The processor 170 may determine the executable execution motion based on the hardware information of the vehicle and the physical limitation of the vehicle, and may generate the execution motion value corresponding to the execution motion.

The processor 170 may compare the target motion value with the execution motion value, may determine that the target motion cannot be executed with the target motion value in the vehicle when the target motion value is not equal to or less than the execute motion value (i.e., when the target motion value is greater than the execution motion value), and may correct the target motion value to be equal to or less than the execution motion value.

When the processor 170 determines that the target motion can be executed by using the target motion value (or the corrected target motion value), the processor 170 may select, as one or more driving actuators, the one or more actuators capable of executing the target motion in an operation 34. According to an embodiment, when the one or more actuators are selected as the one or more driving actuators, the processor 170 may operate each of the one or more driving actuators based on the target motion value (or the corrected target motion value). According to an embodiment, the processor 170 may operate the one or more driving actuators to execute the target motion with the target motion value (or the corrected target motion value) so that the torque is input to the front wheel motor, the rear wheel motor, and the in-wheel motor.

Figure 12:
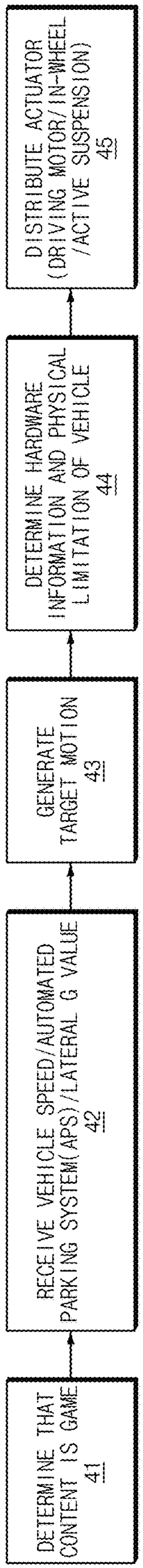
FIG. 12 is a diagram illustrating in detail an operation for controlling a target motion when content determined according to an embodiment of the present disclosure is a game.

FIG. 12 is a diagram illustrating in detail an operation for controlling a target motion when the content determined according to an embodiment of the present disclosure is a game.

As illustrate in FIG. 12, when the processor 170 determines that the content running in the vehicle is the game based on the sound source output from the output device 140 in an operation 41, the processor 170 may receive the vehicle speed, the degree of accelerator pedal pressure, and the lateral acceleration in an operation 42.

The processor 170 may generate the target motion as the roll, the pitch, and the bounce based on the vehicle speed, the degree of accelerator pedal pressure, and the lateral acceleration in an operation 43. In addition, the processor 170 may generate the target roll value, the target pitch value, and the target bounce value.

The processor 170 may determine the hardware information of the vehicle and the physical limitation of the vehicle in an operation 44. The processor 170 may determine the executable execution motion based on the hardware information of the vehicle and the physical limitation of the vehicle, and may generate the execution motion value corresponding to the execution motion.

The processor 170 may compare the target motion value with the execution motion value, may determine that the target motion cannot be executed with the target motion value in the vehicle when the target motion value is not equal to or less than the execute motion value (i.e., when the target motion value is greater than the execution motion value), and may correct the target motion value to be equal to or less than the execution motion value.

When the processor 170 determines that the target motion may be executed by the target motion value (or the corrected target motion value), the processor 170 may select, as the one or more driving actuators, one or more actuators capable of executing the target motion in an operation 45. According to an embodiment, when the one or more actuators are selected as the one or more driving actuators, the processor 170 may operate each of the one or more driving actuators based on the target motion value (or the corrected target motion value). According to an embodiment, the processor 170 may operate the one or more driving actuators to execute the target motion by the target motion value (or the corrected target motion value), so that the torque may be input to the front wheel motor, the rear wheel motor, and the in-wheel motor, and may allow the four-wheel position information to be input to the active suspension.

Figure 13:
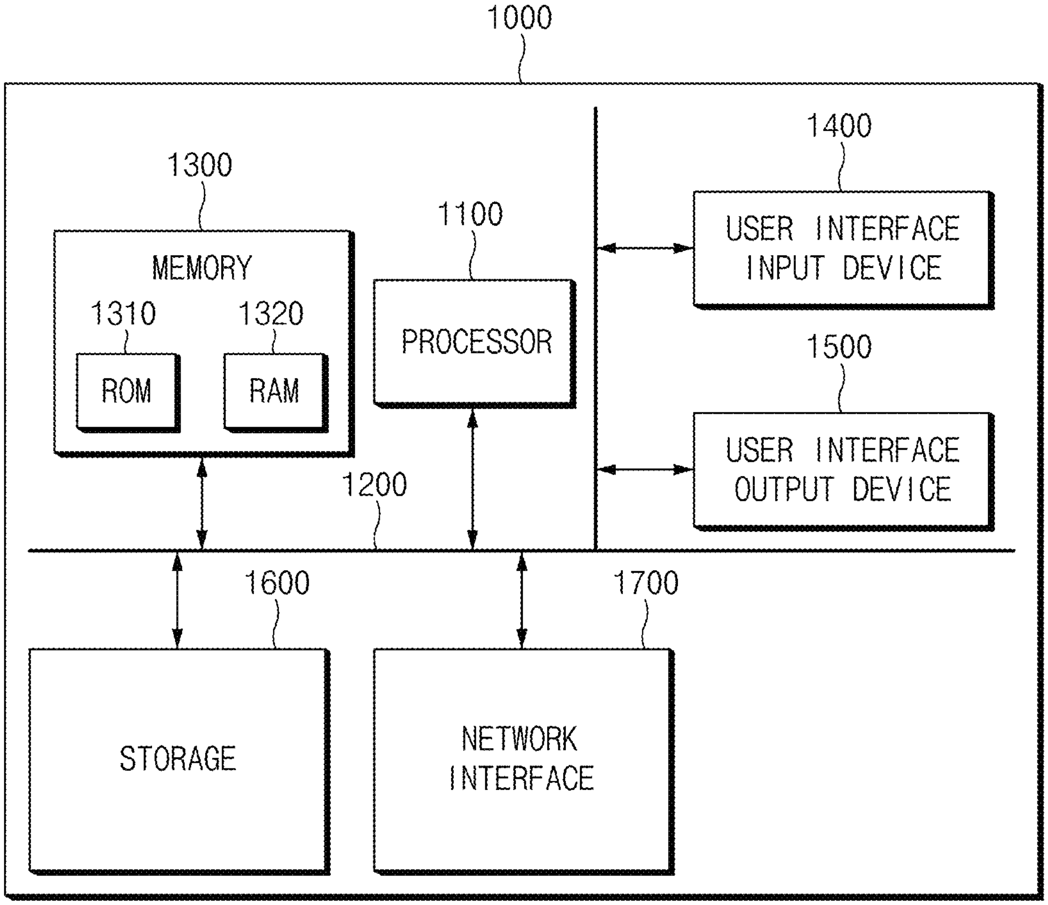
FIG. 13 is a diagram illustrating a configuration of a computing system for executing the method according to an embodiment of the present disclosure.

FIG. 13 is a diagram illustrating a configuration of a computing system for executing the method according to an embodiment of the present disclosure.

Referring to FIG. 13, a computing system 1000 may include at least one of a processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM 1310 and a RAM 1320.

Accordingly, the operations of the methods or algorithms according to embodiments of the present disclosure may be directly implemented with a hardware module, a software module, or any combination of the hardware module and the software module, which is executed by the processor 1100. The software module may reside on a storage medium (e.g., the memory 1300 and/or the storage 1600) such as the RAM, the flash memory, the ROM, an erasable programmable read-only memory (EPROM), the EEPROM, a register, a hard disc, a removable disk, and a CD-ROM. The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another example, the processor and the storage medium may reside in the user terminal as separate components.

A vehicle control apparatus and a method according to embodiments of the present disclosure may provide a new user experience (UX) by controlling the motion of the vehicle together with the content (in-car entertainment) executed in the vehicle.

A vehicle control apparatus and a method according to embodiments of the present disclosure may recognize content running in the vehicle to generate a target motion for the content, to distribute control to one or more driving actuators depending on the target motion, and to drive the one or more driving actuators to control the motion of the vehicle.

A vehicle control apparatus and a method according to embodiments of the present disclosure may define the motion of the vehicle for each hardware of the vehicle by identifying the executable motion depending on the hardware of the vehicle and distributing control to one or more actuators to execute the executable motion.

A vehicle control apparatus and a method according to embodiments of the present disclosure may improve user satisfaction and convenience by controlling the motion of the vehicle depending on the motion customized to the user by generating the target motion with the control value set by the user as well as the content running in the vehicle.

Hereinabove, although the present disclosure has been described with reference to some embodiments and the accompanying drawings, the present disclosure is not limited thereto. Rather, the present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure, but are provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle control apparatus comprising:

an input device configured to receive an input of a user; and a processor configured to generate a target motion based on content running in a vehicle or the input of the user, generate a target motion value corresponding to the target motion, and distribute control to one or more driving actuators to execute the target motion, wherein the content running in the vehicle is determined based on a sound source output through an output device of the vehicle.

2. The vehicle control apparatus of claim 1, wherein the target motion includes at least one of a movement of the vehicle in a forward direction and a backward direction, a movement of the vehicle in an upward direction and a downward direction, a movement of the vehicle in a pitch direction, a movement of the vehicle in a roll direction, or any combination thereof.

3. The vehicle control apparatus of claim 1, wherein the processor is configured to determine, as an execution motion, a motion that is executable by the vehicle based on hardware information of the vehicle.

4. The vehicle control apparatus of claim 3, wherein the processor is configured to generate an execution motion value corresponding to the execution motion based on the hardware information of the vehicle.

5. The vehicle control apparatus of claim 4, wherein the processor is configured to determine whether the target motion value is equal to or less than the execution motion value.

6. The vehicle control apparatus of claim 5, wherein the processor is configured to, when the target motion value is greater than the execution motion value, correct the target motion value to generate a corrected target motion value that is equal to or less than the execution motion value.

7. The vehicle control apparatus of claim 6, wherein the processor is configured to determine that the target motion is executable by the vehicle when the target motion value or the corrected target motion value is equal to or less than the execution motion value.

8. The vehicle control apparatus of claim 7, wherein the processor is configured to select, as the one or more driving actuators, one or more actuators capable of executing the target motion.

9. The vehicle control apparatus of claim 8, wherein the processor is configured to select, as the one or more driving actuators, the one or more actuators capable of executing the execution motion when the processor is capable of executing the target motion using the one or more actuators.

10. The vehicle control apparatus of claim 6, wherein the processor is configured to control driving of the one or more driving actuators based on the target motion value or the corrected target motion value.

11. A method for controlling a vehicle, the method comprising:

generating a target motion based on content running in the vehicle or an input of a user;

generating a target motion value corresponding to the target motion; and distributing control to one or more driving actuators to execute the target motion, wherein the content running in the vehicle is determined based on a sound source output through an output device of the vehicle.

12. The method of claim 11, wherein the target motion includes at least one of a movement of the vehicle in a forward direction and a backward direction, a movement of the vehicle in an upward direction and a downward direction, a movement of the vehicle in a pitch direction, a movement of the vehicle in a roll direction, or any combination thereof.

13. The method of claim 11, further comprising determining an executable motion as an execution motion based on hardware information of the vehicle.

14. The method of claim 13, further comprising generating an execution motion value corresponding to the execution motion based on the hardware information of the vehicle.

15. The method of claim 14, further comprising determining whether the target motion value is equal to or less than the execution motion value.

16. The method of claim 15, further comprising, when the target motion value is greater than the execution motion value, correcting the target motion value to generate a corrected target motion value that is equal to or less than the execution motion value.

17. The method of claim 16, further comprising determining that the target motion is executable when the target motion value or the corrected target motion value is equal to or less than the execution motion value.

18. The method of claim 17, further comprising selecting, as the one or more driving actuators, one or more actuators capable of executing the target motion.

19. The method of claim 18, further comprising selecting, as the one or more driving actuators, the one or more actuators capable of executing the execution motion when the target motion is executable by the one or more actuators.

20. The method of claim 16, further comprising controlling driving of the one or more driving actuators based on the target motion value or the corrected target motion value.

* * * * *